June 28, 1932. P. H. DONOVAN 1,865,090
VEHICLE BRAKE EQUIPMENT
Filed July 18, 1930
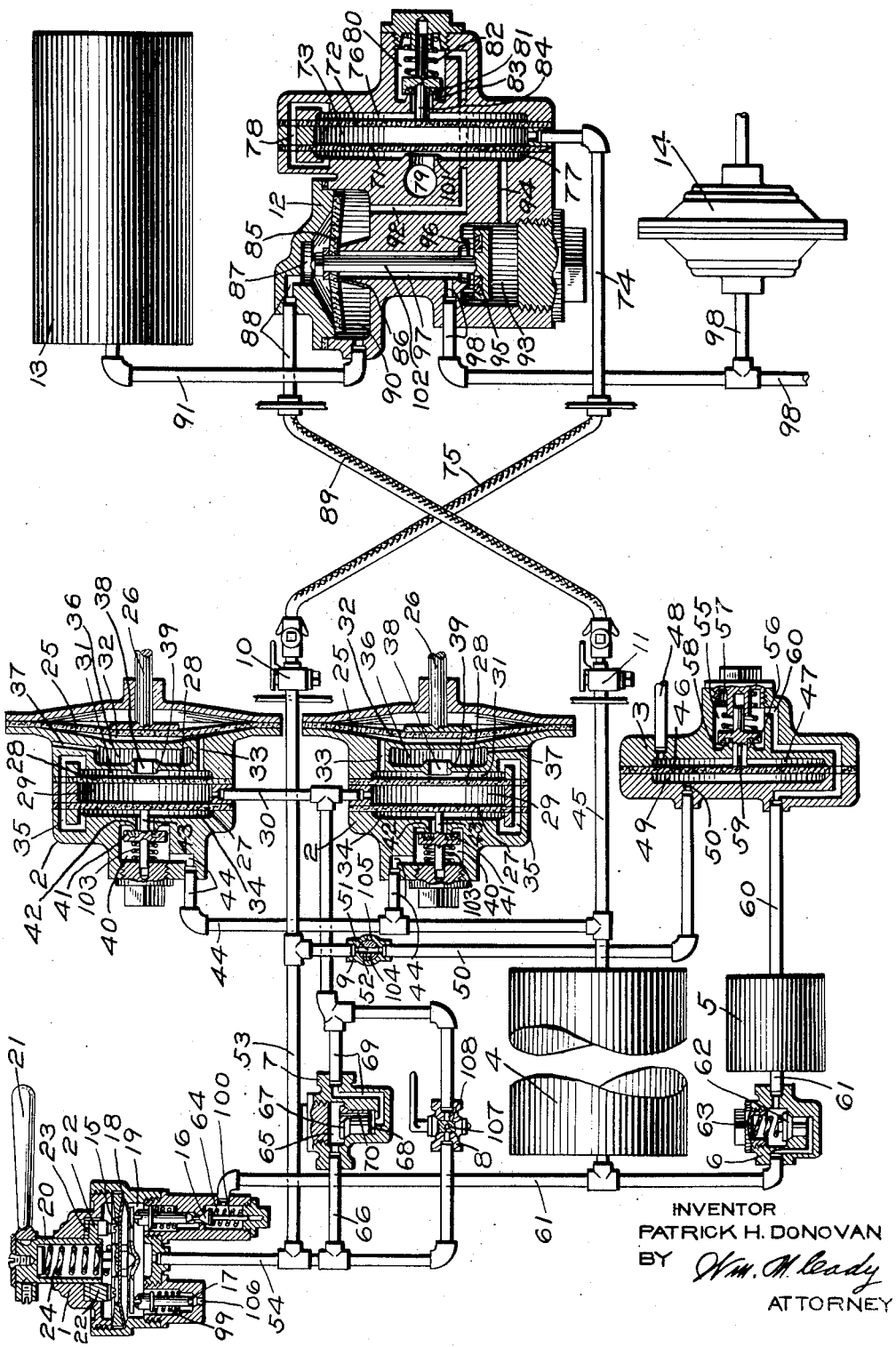
INVENTOR
PATRICK H. DONOVAN
BY Wm. M. Cady
ATTORNEY Patented June 28, 1932

1,865,090

UNITED STATES PATENT OFFICE

PATRICK H. DONOVAN, OF CHICAGO, ILLINOIS, ASSIGNOR TO THE WESTINGHOUSE AIR BRAKE COMPANY, OF WILMERDING, PENNSYLVANIA, A CORPORATION OF PENNSYLVANIA

VEHICLE BRAKE EQUIPMENT

Application filed July 18, 1930. Serial No. 468,816.

This invention relates to fluid pressure brakes, and more particularly to fluid pressure brake equipments for automotive vehicles and trailers.

The principal object of my invention is to provide a fluid pressure brake equipment for an automotive vehicle and trailer embodying means whereby the rate of retardation of the trailer will be at a faster rate than that of the automotive vehicle.

Another object of my invention is to provide a brake chamber device comprising a single casing in which there is a brake chamber, an application valve mechanism and a release valve. By combining these parts a compact brake chamber device is provided which may be connected in the brake equipment by the use of a minimum number of pipes.

A further object of my invention is to provide a fluid pressure brake equipment for automotive vehicles, which equipment embodies novel sanding means for preventing skidding of the vehicle wheels.

Other objects and advantages will appear in the following more detailed description of the invention.

In the accompanying drawing, the single figure is a diagrammatic view, mainly in section, of an automotive vehicle and trailer fluid pressure brake equipment embodying my invention.

In the drawing, the fluid pressure brake equipment for a leading or motor vehicle and trailer is illustrated.

The equipment for the leading vehicle may comprise a brake valve device 1, brake chamber devices 2, a sanding valve device 3, a main reservoir 4, a sanding reservoir 5, check valve devices 6 and 7, and cut-out cock devices 8, 9, 10 and 11.

The equipment for the trailer may comprise a combined application, release and emergency valve device 12, an emergency reservoir 13 and brake chamber devices 14, only one of the brake chamber devices being illustrated.

The brake valve device 1 may be of any desired type, but as shown in the drawing, is preferably of the type shown and described in United States Patent No. 1,533,322, of L. V. Lewis, granted April 14, 1925, and since the details of the brake valve device are fully described in this patent, a detailed description thereof in this specification is deemed unnecessary. However, the brake valve device is described briefly as comprising a casing in which there is mounted a flexible diaphragm 15 which is adapted to control the operation of a fluid pressure supply valve 16 and an exhaust valve 17 through the medium of a plate 18 contained in a chamber 19 at one side of the diaphragm.

At the other side of the flexible diaphragm 15 there is rotatably and slidably mounted in the casing, a sleeve member 20, to the outer end of which an operating handle 21 is secured. The inner end of the sleeve member is provided with lateral projections or wings 22 adapted to operatively engage a cam surface formed on a ring-shaped cam member 23 secured to the casing.

Mounted on the interior of the sleeve member 20 is a coil spring 24 which, at one end bears on the sleeve member and at the other end bears on the flexible diaphragm, the pressure of the spring being regulated upon the rotation of the sleeve member 20.

Each of the brake chamber devices 2 comprises a casing having a flexible diaphragm 25 which is adapted to control the operation of the usual brake rod 26.

Combined with each brake chamber device is an application and release valve device which comprises flexible diaphragms 27 and 28 mounted in the casing in spaced relation to each other. The chambers 29 between the diaphragms 27 and 28 of both valve devices are constantly connected together through a pipe 30. The chamber 31 at one side of the diaphragm 28 is constantly connected to the chamber 32 at one side of the flexible diaphragm 25 through a passage 33 also to the chamber 34 at one side of the diaphragm 27 through a passage 35. Leading from the chamber 31 to a chamber 36, which is connected to the atmosphere through a passage 37, is a passage 38. Within the chamber 31 the casing is provided with an annular seat rib 39 against which the diaphragm 28 is adapted to seat to close communication from the chamber 31 to the atmosphere by way of passage 38, said diaphragm serving as a release valve.

Contained in a chamber 40 in each brake chamber casing is an application valve 41 which is subject on one side to the pressure of a coil spring 103 tending, at all times, to seat the application valve on an annular seat rib 42. Each valve 41 is provided with a stem 43 which terminates within the chamber 34, and the end thereof is operatively engaged by the flexible diaphragm 27.

The chambers 40 are constantly connected together through passages and pipes 44 and through said pipe and a pipe 45 are constantly connected to the main reservoir 4.

The sanding valve device 3 may comprise a casing in which a flexible diaphragm 46 is mounted, the chamber 47 at one side of the diaphragm being constantly connected to a sanding pipe 48 which leads to suitable sand traps (not shown). At the other side of the diaphragm is a chamber 49 which is adapted to be connected to the chamber 19 in the brake valve device by way of a passage and pipe 50, a passage 51 in the plug valve 52 of the cut-out cock device 9, a pipe 53 and a straight air pipe 54.

Contained in a chamber 55 of the casing of the sanding valve device 3 is a sanding valve 56 which is subject, on one side, to the pressure of a spring 57 and which is adapted to seat on a seat ring 58, said valve having a fluted stem 59, the end of which is adapted to be operatively engaged by the diaphragm 46. The sanding reservoir 5 is constantly connected to valve chamber 55 through a pipe and passage 60 and the sanding reservoir and main reservoir are connected through a pipe 61, the check valve device 6 being interposed in this pipe. The check valve device 6 has a check valve 62 which is subject to the pressure of a spring 63 and is adapted to prevent back flow of fluid from the sanding reservoir to the main reservoir.

The main reservoir 5 is connected to a chamber 64 in the brake valve device 1, said chamber containing the fluid pressure supply valve 16.

The straight air pipe 54 is connected to the pipe 30 leading to the chambers 9 in the brake chamber devices 2 and the cut-out cock device 8 is interposed in this pipe between the brake valve device and the pipe 30, which cock device is operative to one position to establish unrestricted communication from the chamber 19 in the brake valve device to the chambers 9, and operative to another position in which such communication is closed.

The check valve device 7 may comprise a casing having a chamber 65 which is constantly connected to the straight air pipe 54, at one side of the cock device 8, through a pipe 66 and which contains a check valve 67. The chamber 68 beneath this check valve is connected to the straight air pipe 54 at the other side of the cock device 8 through a passage and pipe 69. The check valve 67 is provided with a restricted through passage 70 which constantly establishes communication from the chamber 65 to the chamber 68. It will here be noted that the pipes 66 and 69 and check valve device 7 constitute a by-pass about the cock device 8, so that when the cock device is in closed position, the application of the brakes on the leading vehicle will be effected by fluid under pressure supplied through the restricted passage 70 in the check valve 67.

The valve device 12 of the trailer equipment may comprise a casing having flexible diaphragms 71 and 72 mounted therein in spaced relation to each other, the chamber 73 between the diaphragms being connected to the pipe 53 of the truck equipment through a pipe 74, a coupling hose 75 and the cock device 10 mounted on the pipe 53, said cock device being in open position when the truck and trailer are coupled together.

The chamber 76 at one side of the flexible diaphragm 72 is constantly connected to the chamber 77 at one side of the flexible diaphragm 71 through a passage 78, which latter chamber is adapted to be connected to the atmosphere through a passage 79. Contained in a chamber 80 in the casing is an application valve 81 which is subject to the pressure of a spring 82 and is adapted to seat on a seat rib 83. This valve is provided with a stem 84 which is adapted to be operatively engaged by the flexible diaphragm 72.

The emergency portion of the valve device 12 may comprise a flexible diaphragm 85 which is contained in the casing and which is adapted to seat on an annular seat ring 86 and serve as a valve. The chamber 87 at one side of the diaphragm is connected to the main reservoir pipe 45 of the truck equipment through a passage and pipe 88, a coupling hose 89 and the cock device 11 mounted on the pipe 45, said cock device being in open position when the truck and trailer are coupled together. The chamber 90 at the other side of the diaphragm 85 is constantly connected to the emergency reservoir 13 through a pipe 91, and is also constantly connected to the valve chamber 80 through a passage 92.

Contained in a chamber 93 which is constantly connected to the diaphragm chamber 77 through a passage 94 is a valve 95 adapted to seat on an annular seat ring 96. The valve 95 is provided with a stem 102 which extends into a bore 97 in the casing, said bore being connected to the brake chambers 14 through a passage and pipes 98.

Assuming now that the leading vehicle and trailer fluid pressure brake equipments are connected together and the cock devices 10 and 11 are in their open positions, fluid under pressure supplied to the main reservoir 4 by the usual compressor (not shown), flows to the valve chambers 40 of the brake chamber devices 2 through pipe 45 and pipe and passage 44. From the pipe 45 fluid under pressure is supplied to the chamber 87 in the valve device 12 of the trailer equipment through the open cock device 11, coupling hose 89 and pipe and passage 88. Fluid under pressure supplied to the chamber 87 flexes the outer edge portion of the diaphragm 85 downwardly away from the casing, so that fluid under pressure flows from the chamber 87 to the chamber 90 and from thence through pipe 91 to the emergency reservoir 13, thus charging said reservoir. Fluid under pressure from the chamber 90 is also supplied to the application valve chamber 80 through passage 92.

Fluid under pressure from the main reservoir 4 also flows through pipe 61 to the valve chamber 64 in the brake valve device and to the sanding reservoir 5 and from thence, through pipe 60, to the sanding valve chamber 55. Fluid under pressure flowing through the pipe 51 to the sanding reservoir maintaining the check valve 62 of the check valve device 6 unseated against the pressure of the spring 63 until the sanding reservoir pressure is substantially equal to main reservoir pressure when the pressure of the spring will cause the valve to seat.

When the leading vehicle and trailer equipments are coupled together, the cock device 8 is operated to its closed position, as shown in the drawing.

With the equipment fully charged with fluid under pressure and the cock device 8 in its closed position and it is desired to effect an application of the brakes, the operator rotates the brake valve handle 21 to any desired application position in which the discharge valve 17 is seated against the pressure of a spring 99 and the supply valve 16 is unseated against the pressure of a spring 100.

With the valve 16 unseated, fluid under pressure from the chamber 64 as supplied from the main reservoir 4 flows to the chamber 73 in the valve device 12 of the trailer equipment through chamber 19 in the brake valve device, pipes 54 and 53, the open cock device 10, coupling hose 75 and pipe 74. The pressure of fluid thus supplied to the chamber 73 causes the diaphragm 71 to flex toward the left hand and seat on the seat rib 101, thus closing communication from the chamber 77 to the atmosphere through passage 79. The pressure of fluid in this chamber 73 also causes the diaphragm 72 to flex toward the right hand, unseating the application valve 81 against the pressure of the spring 82. With the valve 81 thus unseated, fluid under pressure supplied to the valve chamber 80 from the reservoir 13 through pipe 91, chamber 90 and passage 92 flows to the brake chambers 14 by way of diaphragm chamber 76, passage 78, diaphragm chamber 77, passage 94, chamber 93, past the unseated valve 95, bore 97 and passage and pipe 98.

Fluid under pressure supplied to the pipe 54 also flows to the chambers 29 in the brake chamber devices 2 by way of pipe 66, chamber 65 in the check valve device 7, restricted passage 70, through the check valve 67, pipe 69, pipe 54 at the right hand side of the closed cock device 8 and pipe 30.

The pressure of fluid thus supplied to the chambers 29 causes the diaphragms 28 of the brake chamber devices 2 to flex toward the right hand and seat on seat ribs 39, thus closing communications from the chambers 28 to the atmosphere. Pressure of fluid supplied to the chambers 29 also causes the diaphragms 27 to flex toward the left hand, unseating the application valves 41 against the pressure of the springs 103, so that fluid under pressure supplied from the main reservoir to the valve chambers 40 flows to the chambers 32 by way of chambers 34, passages 35, chambers 31, and passages 33. Fluid under pressure supplied to the chambers 32 causes the diaphragms to flex toward the right hand, actuating the brake rods 26 to apply the brakes.

Fluid under pressure will continue to flow to the brake chamber devices 2 and 14 until the brake chamber pressure present in the chamber 19 of the brake valve device, and acting on one side of the flexible diaphragm 15, is sufficient to flex the diaphragm upwardly against the adjusted pressure of the spring 24. This upward flexing of the diaphragm permits the pressure spring to seat the valve 16 closing off further supply of fluid under pressure to the brake chamber devices. When the valve is thus closed, the upward flexing of the diaphragm ceases, so that the discharge valve 17 is maintained seated, thus automatically lapping the brake valve device and maintaining the desired pressure in the brake chambers.

It will here be noted that when the brake valve device operates to lap position, the pressures on both sides of the diaphragms 27 of the brake chamber devices 2 and on both sides of the diaphragm 72 of the valve device 12 of the trailer equipment are substantially equal, so that the pressures of the springs 103 and 82 will cause their respective valves to seat. The diaphragms 28 and 72 of the brake chamber devices 2 and the valve device 12 respectively will, however, be maintained flexed, since the pressure of fluid on the seated sides of the diaphragms does not act on the entire area of this side of the diaphragm, and communication from the brake chambers to the atmosphere will be maintained closed.

Since fluid under pressure is supplied to the chamber 73 in the valve device 12 at a faster rate than it is supplied to the chambers 29 in the brake chamber devices 2, the application valve 81 will be operated to supply fluid under pressure to the brake chambers 14 at a faster rate than fluid under pressure is supplied to the chambers 32 in the devices 2 by the operation of the valves 41, with the result that the initial retardation of the trailer will be greater than that of the leading vehicle and due to this, the trailer will not be permitted to run in on the leading vehicle, thus preventing the trailer from assuming an angle to its intended line of travel.

If it should be desired to deposit sand on the road in the path of travel of the truck wheels, the valve 52 of the cut-out cock device 9 is rotated to its open position as shown in the drawing, in which position, fluid under pressure supplied to the pipe 53 in effecting an application of the brakes flows to the diaphragm chamber 49 in the sanding valve device 3 through the passage 51 in the valve 52 and through pipe 50. Fluid under pressure thus supplied to the chamber 49, causes the diaphragm 46 to flex toward the right hand, unseating the sanding valve 56 against the pressure of the spring 57. With the valve 56 unseated, fluid under pressure from the sanding valve chamber 55, as supplied from the sanding reservoir 5 through pipe and passage 60, flows to the diaphragm chamber 47 and from thence through the sanding pipe 48 to the sand traps which operate to deposit sand on the road. By operating the valve 52 to its closed position the diaphragm chamber 49 will be vented to the atmosphere by way of pipe 50, a passage 104 in the valve 52, passage 51 in said valve and a passage 105 in the cock casing. With the chamber 49 thus vented, the diaphragm will flex toward the left hand, permitting the pressure of the spring 57 to seat the sanding valve 56, thus closing off the further supply of fluid under pressure to the sand traps. It will be noted that the operator, by the use of the cock device 9, has complete control of the sanding of the road.

To release the brakes, the operator moves the brake valve handle 21 to release position, relieving the upper side of the flexible diaphragm 15 of the pressure of the spring 24. With the pressure of the spring thus relieved, the pressure of the spring 99 causes the exhaust valve 17 to be unseated. With the valve 17 unseated, fluid under pressure is released from the chambers 29 in the brake chamber devices 2 through pipe 30, pipe 54 at one side of the cock device 8, pipe and passage 69, chamber 68 in the check valve device 7, chamber 65, pipe 66, pipe 54 at the other side of the cock device 8, diaphragm chamber 19 in the brake valve device and a passage 106. Upon the venting of fluid under pressure from the chambers 29, the diaphragms 28 flex toward the left hand and are unseated from the seat ribs 39, so that fluid under pressure in the diaphragm chambers 32 is vented to the atmosphere by way of passages 33, chambers 31, passages 38, chambers 36 and passages 37, thus effecting the release of the brakes.

It will here be noted that in effecting the release of the brakes, fluid under pressure released from the chambers 29 raises the check valve 67 of the check valve device 7 from its seat, so that it does not restrict the flow of fluid to the atmosphere, thus insuring the quick release of the brakes.

Further, with the brake valve device 1 in release position, fluid under pressure in the chamber 73 of the valve device 12 of the trailer equipment is discharged to the atmosphere through pipe 74, coupling hose 75, cock device 10, pipe 53, pipe 64, diaphragm chamber 19 in the brake valve device 1 and passage 106. With the chamber 73 thus vented, the diaphragm 71 is flexed toward the right hand and is unseated from the seat rib 101, so that fluid under pressure in the brake chambers 14 is discharged to the atmosphere through pipe and passage 98, bore 97 in the casing of the valve device 12, valve chamber 93, passage 94, diaphragm chamber 77 and passage 79, thus effecting the release of the trailer brakes.

If, for any reason the main reservoir pressure present in the chamber 87 of the trailer valve device 12 should be reduced below the pressure of fluid in the chamber 90, the diaphragm 85 will be caused to flex upwardly from the seat rib 86, carrying with it the valve 95 to its seated position on the seat rib 96. With the valve 96 seated, communication from the brake chambers 14 to the atmosphere is closed off and with the diaphragm unseated from the seat rib 86, fluid under pressure flows from the reservoir 13 to the brake chambers 14 by way of pipe 91, chamber 90, bore 97 and passage and pipe 98, thus effecting an emergency application of the brakes. When the main reservoir pressure in chamber 87 is again restored, the flexible diaphragm will be caused to flex downwardly and to seat on the seat rib 86, closing off the further supply of fluid under pressure to the brake chamber. The downward flexing of the diaphragm causes the valve 95 to be unseated from the seat rib 96 thus opening communication through which fluid under pressure from the brake chambers 14 is released to the atmosphere, thus releasing such an emergency application of the brakes.

Should it be desired to operate the leading vehicle without the trailer, the cock devices 10 and 11 are turned to their closed positions and the cock device 9 is turned to its open position. Now, when fluid under pressure is supplied to the pipe 54 to effect an application of the brakes, the flow of fluid from this pipe will not be controlled by the check valve device 7 but will flow at an unrestricted rate through a passage 107 in the valve 108 of the cock device 8.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with operatively connected fluid pressure brake equipments for a leading vehicle and a trailer, of means for controlling the leading vehicle brake equipment to effect an application of the brakes on the leading vehicle at a slower rate than an application of the brakes is effected on the trailer by the trailer brake equipment.

2. The combination with operatively connected fluid pressure brake equipments for a leading vehicle and a trailer, of means for controlling the leading vehicle brake equipment to effect an application of the brakes on the leading vehicle at a slower rate than an application of the brakes is effected on the trailer by the trailer brake equipment, and means operative for rendering the first mentioned means ineffective to control the application of the brakes on the leading vehicle.

3. The combination with operatively connected fluid pressure brake equipments for a leading vehicle and a trailer, of means for controlling the leading vehicle brake equipment to effect an application of the brakes on the leading vehicle at a slower rate than an application of the brakes is effected on the trailer by the trailer brake equipment, and means operative for rendering the first mentioned means effective or ineffective to control the application of the brakes on the leading vehicle.

4. The combination with operatively connected fluid pressure brake equipments for a leading vehicle and a trailer, of means for controlling the leading vehicle brake equipment to effect an application of the brakes on the leading vehicle at a slower rate than an application of the brakes is effected on the trailer by the trailer brake equipment, and a manually operative cock device for rendering said means effective or ineffective to control the application of the brakes on the leading vehicle.

5. The combination with operatively connected fluid pressure brake equipments for a leading vehicle and a trailer, of means for controlling the leading vehicle brake equipment to effect an application of the brakes on the leading vehicle at a slower rate than an application of the brakes is effected on the trailer by the trailer brake equipment, said means permitting the release of the leading vehicle brakes at substantially the same rate as the trailer brakes are released.

6. In a fluid pressure brake equipment the combination with a brake chamber device comprising a movable abutment operative by fluid under pressure to apply the brakes and operative upon the release of fluid under pressure to release the brakes, a valve operative to supply fluid under pressure to said abutment, a flexible diaphragm for operating said valve, a flexible diaphragm for controlling a port through which fluid is released from said abutment, a chamber between said diaphragms, said diaphragms being operated by an increase in pressure in said chamber for opening said valve and for closing said port, a brake valve device operative to supply fluid under pressure to said chamber, means adapted to restrict the flow of fluid from said brake valve device to said chamber, and a cock device operative to render said means effective or ineffective to restrict the flow of fluid to said chamber.

7. In a fluid pressure brake equipment for an automotive vehicle and a trailer, the combination with brake chambers on said automotive vehicle, of brake chambers on said trailer, valve mechanism on said automotive vehicle for supplying fluid under pressure to the brake chambers on the automotive vehicle, valve mechanism on said trailer for supplying fluid under pressure to the brake chambers on the trailer, a brake valve device operative to supply fluid under pressure to both of said mechanisms to effect an application of the brakes, a check valve having a passage therethrough adapted to restrict the flow of fluid from said brake valve device to the brake chambers on the automotive vehicle, a by-pass around said check valve through which fluid under pressure supplied by the brake valve device is adapted to flow to the brake chambers on the automotive vehicle at an unrestricted rate, and means for closing said by-pass.

8. In a fluid pressure brake equipment for an automotive vehicle and a trailer, the combination with brake chambers on said automotive vehicle, of brake chambers on said trailer, valve mechanism on said automotive vehicle for supplying fluid under pressure to the brake chambers on the automotive vehicle, valve mechanism on said trailer for supplying fluid under pressure to the brake chambers on the trailer, a brake valve device operative to supply fluid under pressure to both of said mechanisms to effect an application of the brakes, a check valve having a passage therethrough adapted to restrict the flow of fluid from said brake valve device to the brake chambers on the automotive vehicle, a by-pass around said check valve through which fluid under pressure supplied by the brake valve device is adapted to flow to the brake chambers on the automotive vehicle at an unrestricted rate, and means operative to control the flow of fluid through said by-pass for rendering said check valve effective or ineffective to restrict the flow of fluid to the brake chambers of the automotive vehicle.

9. In a fluid pressure brake equipment for a leading vehicle and a trailer, the combination with brake chambers on the leading vehicle and the trailer operative by fluid under pressure to effect an application of the brakes and operative upon the release of fluid under pressure to effect the release of the brakes, pressure sensitive valve mechanisms for supplying fluid under pressure to and releasing fluid under pressure from said brake chambers, a brake valve device on said leading vehicle for controlling the supply of fluid under pressure to said mechanisms, and a check valve device for restricting the flow of fluid to the valve mechanism on the leading vehicle and operative to permit the unrestricted flow of fluid from the valve mechanism.

10. In a fluid pressure brake equipment for a leading vehicle and a trailer, the combination with brake chambers on the leading vehicle and the trailer operative by fluid under pressure to effect an application of the brakes and operative upon the release of fluid under pressure to effect the release of the brakes, pressure sensitive valve mechanisms for supplying fluid under pressure to and releasing fluid under pressure from said brake chambers, a brake valve device on said leading vehicle for controlling the supply of fluid under pressure to said mechanisms, a check valve device for restricting the flow of fluid to the valve mechanism on the leading vehicle and operative to permit the unrestricted flow of fluid from the valve mechanism, and means operative for rendering said check valve device effective or ineffective to restrict the flow of fluid to the valve mechanism on the leading vehicle.

11. A brake chamber device for a fluid pressure brake comprising a casing, a movable abutment mounted in said casing operative by fluid under pressure to effect an application of the brakes and operative upon the release of fluid under pressure to control the release of the brakes, a valve in said casing for controlling the supply of fluid under pressure to one side of said movable abutment, a flexible diaphragm mounted in said casing for controlling the operation of said valve, and a flexible diaphragm mounted in said casing for controlling a port through which fluid is released from said movable abutment, a chamber intermediate said diaphragms, said diaphragms being operated by an increase in fluid pressure in said chamber for opening said valve and for closing said port.

12. A brake chamber device for a fluid pressure brake comprising a casing having a brake chamber, and means mounted in said casing for controlling the supply of fluid under pressure to and the release of fluid under pressure from said brake chamber to control the operation of said brake chamber to effect the application and release of the brakes.

13. In a fluid pressure brake equipment for a leading vehicle and a trailer, the combination with brake chamber devices on the leading vehicle, of brake chamber devices on the trailer, valve mechanisms operative by fluid under pressure for supplying fluid under pressure to said brake chamber devices, a brake valve device operative to supply fluid under pressure to operate said mechanisms, a straight air pipe through which fluid under pressure flows from said brake valve device to the valve mechanism on the leading vehicle, a trailer application pipe through which fluid under pressure from said straight air pipe flows to the valve mechanism on the trailer, and valve means operative by fluid under pressure from the trailer application pipe for effecting the sanding of the road.

14. In a fluid pressure brake equipment for a leading vehicle and a trailer, the combination with brake chamber devices on the leading vehicle, of brake chamber devices on the trailer, valve mechanisms operative by fluid under pressure for supplying fluid under pressure to said brake chamber devices, a brake valve device operative to supply fluid under pressure to operate said mechanisms, a straight pipe through which fluid under pressure flows from said brake valve device to the valve mechanism on the leading vehicle, a trailer application pipe through which fluid under pressure from said straight air pipe flows to the valve mechanism on the trailer, valve means adapted to be operated by fluid under pressure from the trailer application pipe for effecting the sanding of the road and means for controlling the flow of fluid to said valve means.

15. In a fluid pressure brake equipment for an automotive vehicle, the combination with brake chamber devices, of a valve mechanism operative by fluid under pressure for supplying fluid under pressure to said brake chambers to effect an application of the brakes, a brake valve device operative to supply fluid under pressure to said mechanism, a straight air pipe through which fluid under pressure flows from said brake valve device to said valve mechanism, an application pipe through which fluid under pressure supplied by the brake valve device is adapted to flow to a trailer fluid pressure brake equipment, a sanding valve device operative by fluid under pressure from said application pipe for sanding the road, and means controlling the flow of fluid from said application pipe to said valve device.

In testimony whereof I have hereunto set my hand, this 15th day of July, 1930.

PATRICK H. DONOVAN.